Jan. 2, 1962
W. A. ZISMAN ET AL 3,015,580
METHOD OF PROTECTING A METAL SURFACE WITH
A COATING OF PRIMARY-N-OCTADECYLAMINE
AND ARTICLE PRODUCED THEREBY
Filed Aug. 30, 1948
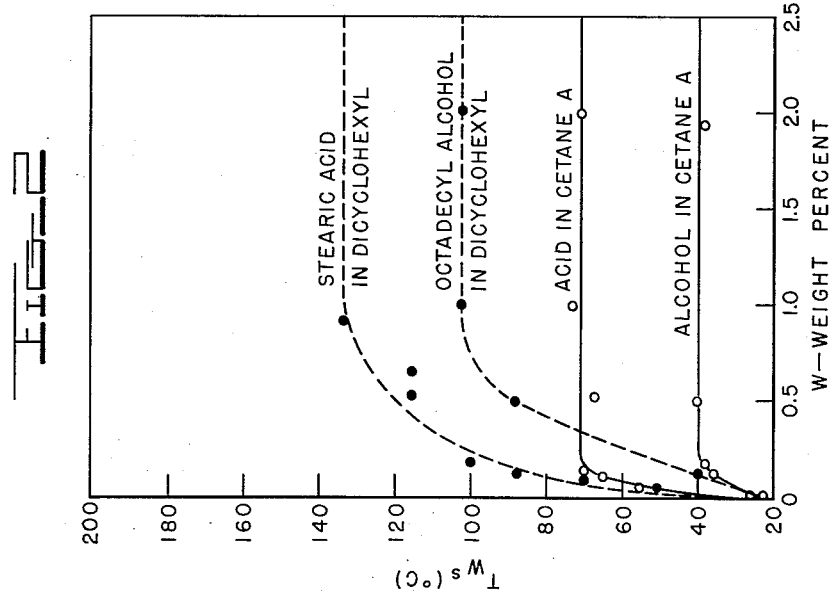
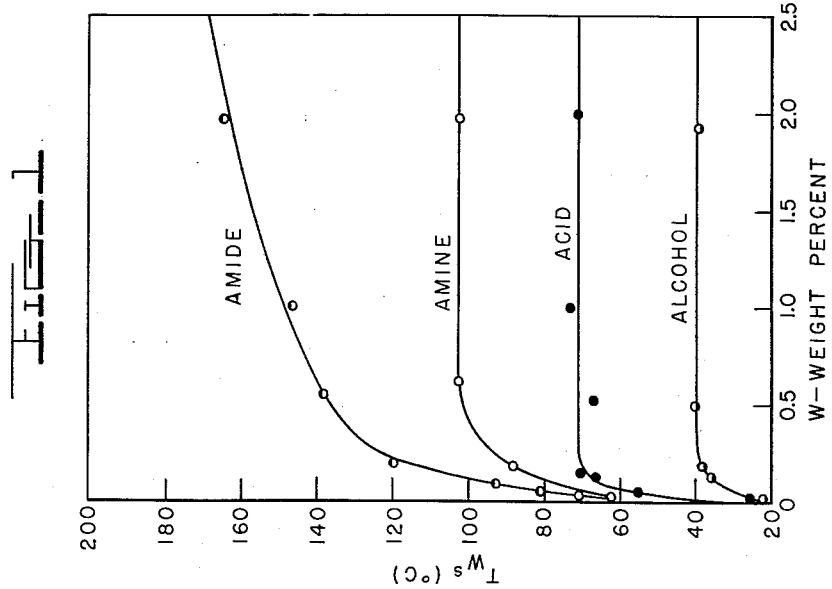
INVENTORS
WILLIAM A. ZISMAN
LAMAR PICKETT
BY
Atty.

United States Patent Office 3,015,580
Patented Jan. 2, 1962

3,015,580
METHOD OF PROTECTING A METAL SURFACE WITH A COATING OF PRIMARY-N-OCTA-DECYLAMINE AND ARTICLE PRODUCED THEREBY
William A. Zisman, Washington, D.C., and Lamar Pickett, Tidwell, Va.
Filed Aug. 30, 1948, Ser. No. 46,844
2 Claims. (Cl. 117—113)
(Granted under Title 35, U.S. Code (1952), sec. 266)

This application is a continuation-in-part of application Serial No. 530,236 filed by William A. Zisman and Lamar Pickett on April 8, 1944, for Protective Films, now abandoned. It is distinguishable therefrom in the matter of greater specificity of the solvents and film forming compounds used; in the method of film application and in the area covering characteristics of the film.

As set forth in the above referenced application, this invention relates to a method of coating or protecting surfaces by applying thereto a monomolecular film, and it is particularly concerned with the protection of metallic surfaces from the corrosive action of water, aqueous solutions and gases, and with the lubrication of small bearings under certain conditions.

The general object of the invention is to provide a method of protecting surfaces from contact with air or water, or aqueous solutions, by coating on the surface a certain type of monomolecular film.

It is a further object of the invention to provide a method of protecting surfaces by coating said surfaces with a continuous hydrophobic and oleophobic film which is not only monomolecular in structure but which is composed of molecules which are oriented by adsorption of their polar ends to said surfaces with their opposite ends forming a surface of closely packed hydrocarbon radicals.

It is an additional object of the invention to provide a method of treatment of surfaces whereby oil may be restricted to a particular area and prevented from spreading over the entire surface.

The attainment of these objectives and of others will be apparent from the following description and the scope of the invention will be defined by the claims.

The protection of surfaces, particularly metallic surfaces, from corrosion by common fluids with which they come in contact has been the subject of much study for many years. Where actual painting of the metal surface is undesirable, resort has been had to covering the surface with certain oils, known as slushing oils, and greases to seal the surface from contact with air or water or other non-oily fluids. Some oils are better protective agents than others, but they have a common disadvantage in that usually they must be cleaned from the surface of the coated article before the latter is put into service. This is particularly true of precision machine and instrument parts which have been stored in heavy protective oils and greases. In addition, there is oftentimes the problem of protecting exposed areas of moving parts during their operation, and also maintaining adequate lubrication in localized areas, such as in fine watch movements and other precision instruments.

This invention provides a method of protecting surfaces from contact with air or water, or aqueous solutions, by coating on the surface a certain type of monomolecular film. This film is, of course, invisible and dry, and its presence is most readily demonstrated by its hydrophobic and oleophobic properties. Also, this invention provides a method of confining lubricating oil to a small area where lubrication is desired and of preventing spreading of the oil away from this area. Surfaces coated with these films are also included in the invention.

The method or process of this invention is based on the discovery that a truly protective monomolecular film which is both hydrophobic and oleophobic must present, toward liquids or fluids coming in contact therewith, an apparent "hydrocarbon" surface which is made up of closely packed methyl groups. The more closely the methyl groups are packed, the more impervious the film will be to all fluids coming in contact therewith.

In order to obtain a closely packed array of methyl groups at the outer surface of the film it is necessary to employ molecules having long hydrocarbon chains terminated at one end in a methyl group, or in some cases plate-like configurations presenting methyl groups at one end or edge may be used. Generally, the chain should preferably be relatively free from branches or links which cause a bend therein, such as unsaturated bonds or non-carbon linkages in the main part of the chain. At or near the other end of the chain there must be a polar group, such as acid, hydroxy, amine, amide, ketone and the like, so that the molecule will be attracted to the surface to be protected and properly oriented thereon. The polar groups which provide the strongest attraction to the surface, especially metal surfaces, are acid, alcohol, amine and amide groups. The film-forming ability of chain molecules is a function of chain length and in general, the preferred chain length is at least 10 carbon atoms. The film is deposited on the surface to be protected, e.g. a clean metal surface, by dissolving a small amount of long chain compound to be used in a hydrocarbon or other organic solvent, such as hexadecane, and the surface coated therewith. At first the solution wets the surface and flows evenly over it. Then, when the film is formed, the solution or remaining hydrocarbon draws away from the surface, indicating that the latter has become oleophobic. The excess solution is drained from the surface, leaving the protective film in place.

Using grease-free glassware and metal dippers, many tests were made on films formed from different compounds in different solvents. All surfaces were bright or polished, and they were cleaned in chromic acid, washed with distilled water and dried before the test by heating to dull red heat in a gas flame. After deposition of the film on the cleaned surface the contact angle between it and a drop of solution, solvent or water was measured, high contact angles indicating repellency according to standard theories and practice.

Various members of the homologous series of the saturated aliphatic and unbranched monocarboxylic acids and primary amines were dissolved in hexadecane in increasing concentrations and were tested with a platinum dipper for the ability to form oleophobic adsorbed films at 25° C. The effect of the molecular chain length was simple. In general when the number of carbon atoms exceeded 14, films oleophobic to pure hexadecane would result. Those compounds having less than 14 carbon atoms were oleophobic to the hexadecane solution but not to pure hexadecane. When the chain length was less than 8 carbon atoms no films were formed which were oleophobic to the hexadecane solution no matter how concentrated. The films were hydrophobic, however. When the film was oleophobic to the oil solution, it appeared to be true that the lesser the chain length the greater was the concentration required in the solution to form an oleophobic film. In general, compounds having chain lengths of less than 10 carbon atoms do not form very satisfactory films because of the excessively high concentrations required. Similarly, increasing the temperature increased the minimum concentration of film forming substance required to form the oleophobic film.

The magnitude of the contact angle exhibited by a drop of hexadecane increased rapidly with chain length of the molecules forming the film, reaching a maximum of between 40° to 42°. Thus, in the case of primary aliphatic amines the contact angle was 32° for a chain length of 16 carbon atoms, and it was 42° for a chain length of 18 carbon atoms or higher. The same maximum value was found for other straight chain compounds studied. This would be expected on the theory that all that determines the contact angle is the closeness of packing in the outermost methyl-rich plane of the protective film, and that it should attain a constant value when the chain length becomes sufficiently large.

Although stearamide and myristamide were nearly insoluble in hexadecane at room temperature, they dissolved at elevated temperatures (e.g. 50° C. or more) to permit the adsorption on platinum or glass (and other clean surfaces) of a monomolecular layer which was found to be oleophobic to the solution. If the adsorbed films were cooled to 25° C., the stearamide layer was found to be oleophobic to pure hexadecane, the contact angle being 40°, while the myristamide layer was wetted.

In the case of long chain esters, such as melissyl acetate, oleophobic and hydrophobic films may be similarly formed, but the ester link must be near the end and the hydrocarbon chain quite long. On the other hand, oleic acid and its trans isomer elaidic acid, dissolved in hexadecane would not form oleophobic films, presumably because the double bond occurs in the carbon chain in such a way that close packing of the end methyl groups is prevented, or due to adsorption at the double bond. Such compounds do, of course, form hydrophobic films. Compounds having two polar groups per molecule will form oleophobic films if the polar groups are located at or near one end and the carbon chain is long. For example, solution of batyl alcohol

$(CH_3(CH_2)_{17}OCH_2CHOHCH_2OH)$ in hexadecane formed oleophobic films at room temperature with weight concentrations of the alcohol in the solvent of as low as $10^{-5}$. Exceptionally pure solution in hexadecane of alpha and beta monopalmitin deposited oleophobic films. The alpha compound formed a film which was oleophobic to the solution but not to the pure solvent, whereas the beta compound formed a film which was oleophobic to both solution and solvent, the contact angle being between 35° and 40°.

Studies made with pure 11-hydroxystearic, 13-hydroxystearic, palmitic alpha hydroxy acids and 4- and 12-ketostearic acids showed that the presence of one hydroxy or keto group in a long carbon chain does not prevent a fairly close packing of the adsorbed molecules, because these compounds formed films oleophobic to solution and solvent. On the other hand, molecules having branched hydrocarbon chains do not form oleophobic films. Such compounds include tripalmitin, tristearin, propyl tetradecyl acetic acid and the like.

The above facts may be summarized in that oleophobic films can be made from hexadecane solutions of a wide variety of polar compounds. In order to form such films the geometry of the molecule is important. A polar molecule whose shape is a long rod capable of close packing when adsorbed will form oleophobic films. Aliphatic molecules with long branches or molecules consisting of rings and straight chains do not adsorb as oleophobic films. Double or triple bonds in 18 or less carbon atom chains prevent olephobic film formation, but they do not affect very long chain molecules to the same extent. Molecules with straight hydrocarbon chains and more than one polar group can form oleophobic films if the positions and sizes of the polar groups do not prevent close packing when adsorbed.

The oleophobic films so far described were produced by adsorption from solutions in hexadecane of long chain compounds. However any one of a large variety of solvents can be used. From a study of light and also heavy petrolatum, the following compounds were found to adsorb as oleophobic films not wetted by drops of either the solution of pure hexadecane: batyl alcohol, primary normal octadecyl and heptadecyl amine, the normal saturated fatty acids from eicosanoic down to tetradecanoic, 13-hydroxy stearic acid, 11-hydroxy stearic acid and ricinelaidic acid. The following compounds adsorbed as films which were oleophobic to drops of the petrolatum solution but not to drops of pure hexadecane: tridecanoic, dodecanoic, and octanoic acids and hexadecyl, dodecyl and decyl alcohols. No oleophobic films could be obtained from oleic and elaidic acids, ethyl ricinoleate, xenylstearic or tetrahydronaphthylstearic acid. The effect of concentration was studied and the same general behavior was found as with solutions of the same compounds in hexadecane. The only significant difference was in the much longer time necessary for complete adsorption equilibrium. This is to be expected since the much greater viscosity of the petrolatums than the hexadecane required a correspondingly greater increase in time for the polar molecules to diffuse through the oil to the metal-oil interface. It was also found that the compounds not capable of forming oleophobic films when adsorbed out of hexadecane solutions behaved in the same way in petrolatum solutions.

Many polar compounds dissolved in the low boiling hydrocarbons such as petroleum ether and benzene also adsorbed on metals and glass as oleophobic films. For example, eicosyl alcohol in petroleum ether formed films on platinum oleophobic to the solution but not to drops of pure petroleum ether. The contact angles with respect to drops of hexadecane and of water were 30° and 100° respectively. Solutions of octadecyl amine in benzene behaved quite similarly. The effect of decreasing the concentration of amine proportionately increased the time for completing the close-packed adsorbed monolayer. At a weight concentration of $10 \times 10^{-4}$ the film was still oleophobic, at $2 \times 10^{-5}$ it was barely oleophobic, and at greater dilutions the film was wetted by hexadecane. Hence, the life-time of adsorption was not quite as great as in hexadecane. It was concluded that this difference between the behavior of octadecyl amine in hexadecane and in benzene was due to the much greater ability of the benzene to dissolve the adsorbed monolayer.

Oleophobic films were deposited from solutions of n-octadecyl alcohol in brombenzene, diphenyl oxide, dicyclohexyl, decahydronaphthalene and tetrahydronaphthalene.

Stearamide in the following hot solvents formed oleophobic films; monodecyl benzene, diphenyl oxide and alpha-methyl naphthalene. The adsorbed film was not wetted by hexadecane when adsorbed from hot or cold solutions in either dicyclohexyl or bromobenzene and from hot solutions in decahydronaphthalene, tetrahydronaphthalene, monodecyl naphthalene, or tert-amyl naphthalene.

The use of other solvent oils than hexadecane permitted a much greater variety of polar substances to be tested for the ability to adsorb as oleophobic films. The following polar compounds were tested in the various hydrocarbon solvents already mentioned without any indication of the formation of films oleophobic to either the solution or to pure hexadecane: abietic acid, alpha-naphthalene propionic acid, beta-naphthoic acid, beta-naphthol, tri-phenyl carbinol, p-hydroxy diphenyl, tri-p-cyclohexyl phenyl carbinol, p-amido diphenyl, acridine, n-phenyl diethanolamine, and tri-p-cresyl phosphate. Even when concentrations up to the solubility limits were tried, oleophobic films could not be found. A simple explanation is that each of these substances although adsorbed is not able to form a close-packed monolayer, the outermost portion of which is sufficiently rich in methyl groups. The results observed would then be expected for all these compounds except the abietic acid and the tri-p-cresyl phosphate. For each of these two, due to the fact that the molecular configuration is not even remotely rod-like or plate-like, the adsorbed monolayer will contain methyl groups in its outermost portion, and they will not be packed close enough together to prevent the oil penetrating through them and reaching the $CH_2$— and phenyl groups and thus causing wetting.

By the use of these various solvents a number of new compounds were found capable of forming oleophobic films on platinum or glass from solution. Thus cholesterol formed films oleophobic to the solution but not to drops of either the pure solvent or to hexadecane from the following oils: dicyclohexyl, diphenyl oxide, brombenzene, tri-amyl benzene, and p-octadecyl toluene. It was not able to form oleophobic solutions from mono-amyl napthalene, dodecyl toluene, alpha-methyl naphthalene, tetrahydronaphthalene and decahydronaphthalene. The inability to form oleophobic films from some solutions was found among the best and the worst solvents for cholesterol of those tested. In the case of solutions of cholesterol in dicyclohexyl, it was found that oleophobic films were deposited on platinum only when the weight concentration exceeded a value somewhere between $1 \times 10^{-3}$ and $5 \times 10^{-3}$. Hence, cholesterol, like the alcohols, has a brief lifetime of adsorption from solution in dicyclohexyl.

The structure of cholesterol may be said to be like that of a plate with an eight-carbon aliphatic branched chain hydrocarbon group or rod attached to one end of the plate and a hydroxyl group at the other end. Attached to the free end of the aliphatic chain are two methyl groups. Hence, cholesterol adsorbs on solids so that the outermost portion of the film forms a plane rich in methyl groups. The fact that the adsorbed film is wetted by drops of hexadecane can be interpreted to mean that the methyl groups are not sufficiently close-packed to prevent the molecules of oil from penetrating the methyl-rich plane and reaching the —$CH_2$— groups.

Good oleophobic films were prepared from aqueous solutions. Thus palmitic alpha hydroxy acid, stearic acid, batyl alcohol and dodecylamine were dissolved in hot water or in 50–50% by weight mixtures of ethyl alcohol and water at room temperature or were heated to 50° C., and the films deposited on polished metal or glass surfaces behaved in every way like the oleophobic films from non-aqueous systems.

The previous tests for the oleophobic nature of the monolayer adsorbed on a solid from oil solution were made by the observation of the contact angle of a drop of the oil solution or of a drop of hexadecane. It was of interest to observe the tendencies of a variety of oils to wet an oleophobic monolayer. Monolayers on platinum of octadecyl amine, eicosyl alcohol and batyl alcohol were tested at 25° C. with a drop of any one of a number of pure hydrocarbon oils. It was found that the contact angle decreased with the boiling point of the liquid. All of the higher boiling oils such as hexadecane, octadecane, octadecyl toluene, cyclohexyl tridecane, and petrolatum were oleophobic to the monolayers and exhibited contact angles varying from 45° to 25°. On the other hand, the lower boiling liquids such as hexane, octane, benzene, toluene, and cyclohexane all completely wet the monolayers. Liquids having intermediate boiling points exhibited contact angles varying from 30° to 15°, but in most cases wet the area underneath the drop fairly rapidly. This could be observed by rolling the drop off a given portion of the surface after a definite time of contact. Evidently the solubility of the monolayer in the oil drop was principally involved.

When the wetting of the oleophobic monolayer was tested by each member of a homologous series of hydrocarbons, the contact angle decreased with the boiling point and molecular weight. Using the series of normal saturated hydrocarbons, it was found that the contact angles were 38°, and 32°, 28°, 20° and 0° for octadecane, tetradecane, dodecane, decane and octane, respectively. The time required for the drop to wet the monolayer beneath decreased with the chain length.

Therefore it is evident that any one of a large number of high boiling hydrocarbons can be used for test drops in order to ascertain the oleophobic nature of the monolayer adsorbed on a solid. In this work it has been most convenient to use drops of hexadecane because of its known rod-like structure and the ease of preparing considerable quantities in a highly purified form.

The temperature at which the films are deposited from solution is important in determining the oleophobic properties of the film. Above a certain temperature oleophobic films are not obtained, with a given polar compound and solvent, unless the concentration of the compound in the solvent is increased. In the latter case the temperature at which the oleophobic film disappears is increased. Generally all long chain polar compounds capable of forming oleophobic films will do so at room temperature if they are sufficiently soluble in the solvent to provide a solution of reasonable concentration. Where the polar compound is only insignificantly soluble at room temperature, an oleophobic film may be adsorbed from hot solution and dried which will withstand very well the action of the pure solvent on cooling. Such a procedure is preferred where the strongest and most durable oleophobic properties are required.

From the foregoing description and exemplification it is apparent that there are certain characteristics which are required of the effective solvents. In addition to the extensive use of hexadecane as a solvent as described supra, the applicants tried the following hydrocarbons as solvents for primary n-octadecylamine: n-octane, n-decane, n-dodecane and n-tetradecane; benzene, p-di-sec-amylbenzene, triamylbenzene, dodecylbenzene, para-sec-dodecyltoluene, and p-sec-octadecyltoluene; tert-butyl-naphthalene, hydronaphthalene, decahydronaphthalene and dicyclohexyl. Observations were also made on solutions in petroleum ether, diphenyl oxide and bromobenzene. Any of the higher boiling fluids in this list manifesting the ability to spread on alkaline or acid water was contacted with a suitable adsorbent until no spreading was evident. The solvents used were chosen in order to test a variety of organic structures, solubilities and boiling points, and because their use would permit the study of polar compounds found to be insoluble in hexadecane. It was found that oleophobic monolayers of octadecylamine could be adsorbed on platinum or glass from dilute solutions in all of these fluids.

A suitable solvent must have some solubility for the oleophobic polar compound used since the process of coating surfaces is one of adsorption from solution. The solubility should not be too great for then the concentration of solute needed would become too large and the average lifetime of adsorption too short. Usually liquids of high volatility are not convenient because of fire and health hazards. Of course liquids are chosen which are non corrosive or unreactive with the solid surface to be coated.

The nature of the film forming compounds can be best inferred from a consideration of the film formed on a platinum dipper by primary n-octadecylamine from a dilute solution thereof in hexadecane. This solution had a corrected weight concentration of $10^{-7}$ and a mass of 10 grams, or $2 \times 10^{+15}$ molecules. The total area of both sides of the dipper is about 5 cm.$^2$ and the known sectional area of an aliphatic amine molecule is approximately $25 \times 10^{-16}$ cm.$^2$. Thus, it was calculated that a minimum of $5/25 \times 10^{16}$ or $2 \times 10^{15}$ adsorbed molecules would be necessary to coat the dipper surface. Because there were only this many molecules present in the solution, it appeared possible that the oleophobic film was monomolecular in nature, being composed of nearly close packed, oriented molecules.

The fundamental nature of this observation and its theoretical significance made it at once necessary to further the investigation. Therefore the following simple adsorption experiment was carried out. The solvent used was Eastman dicyclohexyl (M.P. 3.6° C.; reported value, 4.0° C.) purified by percolation through adsorption columns containing silica gel and alumina. A solution having a mass of 4.75 g. and weight concentration of $2.68 \times 10^{-5}$ of n-octadecylamine was prepared in it. This solution was placed in a Pyrex glass container having the shape of a rectangular parallelepiped whose internal dimensions were 43 mm. high, 26 mm. wide and 7 mm. thick. The fluid used initially filled the cell to a height of approximately 30 mm. A polished platinum dipper 22 mm. x 26 mm. x 0.05 mm. was mounted on the end of a strong platinum wire and arranged so that it could be dipped slowly in and out of the solution. The platinum sheet was allowed to remain immersed in the solution at 25° C. until oleophobic to the solution and then it was removed slowly to avoid carrying drops of solution with it. Upon removal the dipper was cleaned by a brief heating to dull redness in the non-oxidizing portion of the flame of a Bunsen burner, after which it was allowed 30 seconds to cool to room temperature, then the next dip was made. Observations were made after each dip of the contact angle between the horizontally held oleophobic dipper and a drop of distilled water. Throughout the first 60 dips the C.A. was between 85° and 90°. Between the 60th and 65th dips the C.A. decreased from 85° to 80°, between the 65th and 70th dips it decreased from 80° to 75°, while between the 70th and 75th dips it dropped rapidly below 75°.

A further consideration of the structure of primary n-octadecylamine as a prototype of the preferred film forming compounds is very informative. A molecule of this amine in its normal or stretched out configuration can be considered as a long rod at the opposite ends of which are located the methyl group and the polar —$NH_2$ group. A number of such molecules can adsorb on a flat surface as a close-packed assembly of vertically-oriented rods to form a monolayer adhering to the surface as the result of the attraction of the surface for the —$NH_2$ groups. Each methylene group in the aliphatic chain has a highly localized field of force attracting it to the methylene groups in the adjacent chains. Hence, if the molecules are packed sufficiently closely they will cohere due to the force contributions between each pair of horizontally adjacent methylene groups. The total force will increase with the length of the hydrocarbon chain. Such an adsorbed monolayer exposes to outside approach a surface more or less closely packed with oriented methyl groups. Apparently the hydrocarbon molecules in a drop of hexadecane or dicyclohexyl so weakly adhere to the only accessible portions of this adsorbed monolayer that the surface tension forces of the oil drop are able to draw it up into a drop having a considerable contact angle. If the plane of this surface is tilted, the oil drop adheres so weakly that it rolls about readily or is "oleophobic."

From the above discussion it follows that the greater the chain length of the molecules the more condensed and rigid the film will be. The monolayer will change from the close-packed solid, to the plastic-solid, and even to the liquid state, as the temperature is raised or if the chain length is decreased. Increasing the temperature and decreasing the chain length also increases the solubility of the film in the oil. The net effect will be to decrease the average lifetime of adsorption of the molecules and eventually the film will dissolve or desorb. When the oleophobic film is a plastic-solid or rigid monolayer, very likely it is able to form suspension bridges over each depression in the surface of the solid whose area is not too large compared to the cross sectional area of the molecules. Such an effect should give to the long-chain compounds the ability to form oleophobic films having less roughness than the underlying surfaces and thereby the energy of adhesion between a drop of oil and the film covered surface would be further decreased.

The applicants found that in the development of these monomolecular films on a surface that the concentration of the solution greatly affected the time required for the formation of the film. Upon testing solutions of weight concentrations of $10^{-3}$, $10^{-4}$, $10^{-5}$, $10^{-6}$, and $10^{-7}$, it was found that oleophobic films adsorbed on platinum down to concentrations of less than $0.5 \times 10^{-6}$ of the amine, while the acid solutions behaved similarly down to less than $7 \times 10^{-6}$. No oleophobic film could be obtained for solutions of eicosyl alcohol whose concentrations were less than $4.4 \times 10^{-4}$. At a concentration of $10^{-3}$ the film was formed in a few seconds. The more dilute the solutions became the more time was found to be required for the polar molecules to diffuse through the oil and completely coat the platinum surface with an oleophobic film. In case of the most dilute solution employed successfully ($10^{-7}$), the time required when no stirring took place was over 8 hours. Of course the actual concentrations of the more dilute solutions were affected by the loss of the additive which adsorbed on the walls of the containers used, but the necessary corrections were made and were not important until the weight concentrations were below $10^{-5}$. Also the rate of withdrawal of the surface from the solution has a very important effect on the formation of the monomolecular film. The rate of withdrawal varies with the viscosity of the solution. In general it should be a few centimeters per second or even less. When withdrawn at such a slow rate a dry surface which is covered with a monolayer is produced. If withdrawn at a faster rate drops of solution adhere, which, if the solution is volatile, cause drops of the solution to adhere to the monolayer. Upon evaporation of these drops concentrations of unoriented solute are deposited on top of the monolayer, which are neither oleophobic nor hydrophobic. If the solvent is not volatile a light shaking causes the drops to roll off.

As above set forth, the time of immersion before withdrawal depends upon the concentration of the solute and the viscosity of the solvent, being longer the more dilute the solute and the more viscous the solvent. This is due to the fact that diffusion of the polar molecules to the metal surface must take place. The briefer the average lifetime of adsorption of the solute on the surface the greater is the necessary concentration. For example, solutes with a short lifetime adsorption are: octadecyl alcohol, cholesterol and methyl mellisate. Solutes with relatively long lifetimes of adsorption are: primary n-octadecyl amine, arachidic acid and batyl alcohol.

The effect of temperature on the formation of monomolecular films is not limited on the low temperature side as long as the polar molecules do not precipitate out or the solvent does not freeze. For example, excellent films can be produced using primary n-octadecyl amine or stearic acid at 10° F. Higher than room temperatures are only necessary when the polar solute happens to be too insoluble at room temperature in the solvent selected. For example, stearamide is too insoluble in hexadecane or dicyclohexyl at room temperature, but at 40–50° C. or higher they exert a sufficiently solvent effect to produce good films of stearamide.

If the temperature is too high a close packed or oleophobic film cannot form because of the decrease in the average lifetime of adsorption. The applicants found that increasing the temperature of solvents of long-chain polar compounds in non-polar solvents caused a decrease in the ability of the polar compounds to adsorb on solid surfaces as oleophobic monolayers. The effect of temperature changes on oleophobic properties was conveniently studied by using a simple apparatus named a "dip cell." Satisfactory cells were made from Pyrex in sizes of 5, 10, and 25 ml. total capacity, the smallest size being used for the study of rare chemicals. The temperature of the liquid was measured with a thermometer inserted into the cell through a ground glass joint so arranged that the bulb was entirely immersed in the liquid which half filled the well of the cell. A rectangular dipper of platinum foil was spot welded to the end of a long, rigid platinum wire which projected beyond the ground glass joint, thus permitting the dipper to be lowered in and out of the solution by the manipulation of the free end of the wire. The cell was heated inside an electrically controlled oven which was equipped with a window and an internal light source to facilitate observation of the condition of the dipper and with an opening in the top of the oven through which the free end of the platinum wire and the thermometer stem projected. At intervals, while the temperature of the solution was being slowly increased, the dipper was raised out of the solution to observe whether the dipper surface was repellant to the liquid. If the liquid rolled off, leaving a dry surface, it indicated that the foil was covered with an adsorbed film which was oleophobic to the solution at the temperature of observation. The dipper was lowered back into the solution and the temperature was further increased until time for the next observation. This was repeated until a critical temperature ($T_w$) was reached at which the dipper remained completely wetted by the solution when withdrawn from the solution.

Reference is now made to the drawings hereto attached. In FIGURE 1 is shown the effect on critical temperature $T_w$ of concentration and polar group of 18-carbon compounds, viz, stearamide, primary n-octadecyl amine, stearic acid and octadecyl alcohol dissolved in cetane-A. The existence of a saturation effect is evidenced by the nearly horizontal asymtotic maximum of each of these curves. The asymtotic value is smallest for the least adsorbable compounds and greatest for the most adsorbable. It will be noted that the highly adsorbable amide still shows curvature at the relatively high concentration of 2.0%.

In FIGURE 2 the effect of two solvents on the critical temperature $T_w$ is shown. Here the critical temperature of both stearic acid and octadecyl alcohol in cetane-A is lower than that of solutions of the same solutes in dicyclohexyl.

These monomolecular films have been produced by the applicants on clear polished surfaces of the following diverse materials: platinum, gold, nickel, molybdenum, tantalum, iron, 18–8 stainless steel, copper, aluminum, chromium, tin, zinc and 50–50 lead-tin solder, etc. Among the non-metal surfaces. quartz. Pyrex, soda-lime glass, ruby and sapphire may be used. They have been unable to produce such films on plastics such as Bakelite and Lucite.

Monomolecular oleophobic films may be made from commercial soaps of the saturated fatty acids such as ferric stearate, calcium palmitate, lead stearate etc. But in all cases the film is that of the fatty acid alone which is present as an impurity of the soap. Even soaps of oleic acid have been found to form such films wherein the film deposited is stearic acid and other saturated unbranched acids which are generally present in the commercial oleic acid used to produce oleates. When extreme care is used to eliminate the acid impurities in both classes of soaps, the resulting products are practically insoluble in hydrocarbons and no oleophobic films can be formed.

From the foregoing it is seen that the structural formation of the molecule forming the oleophobic monolayer is all-important. For instance, any aliphatic polar molecule whose normal configuration is like that of a long rod, permitting close packing when adsorbed, forms oleophobic films over the proper temperature range. Examples are the homologous series of acids, alcohols, amines, amides and esters, all having from 14 to 20 carbon atoms in their chain. Also compounds whose molecular configuration resembles a flat plate with a polar group at the rim of the plate and one or more methyl groups at the opposite rim can also, apparently, satisfy the two requirements of close-packing and an outer plane surface (opposite the adsorptive groups) densely populated with methyl groups. An example of this plate-like structure is cholesterol which forms oleophobic films from suitable solvents.

The area covered by one pound of octadecylamine as a monomolecular film is arrived at as follows:
Molecular weight of octadecylamine $$CH_3\text{---}(CH_2)_{17}NH_2 = 269.5$$

1 pound contains 453.59 grams.

$$\frac{453.6}{269.5} = 1.683 \text{ moles per pound}$$

Assume that the cross-sectional area of a molecule is 30 $A^2$.

There are $6.02 \times 10^{23}$ molecules per mole (Avogadro's constant).

Therefore $30 \times 10^{-20}$ sq. meters/molecule $\times 6.02 \times 10^{23}$ $\times 1.68 = 3,039 \times 10^5$ sq. meters.

1 square meter contains 10.76 square feet.
Therefore $3,039 \times 10^5$ meters equals $3.27 \times 10^6$ sq. feet which is 3,270,000 sq. ft. per pound.

Thus one pound of octadecyl amine will cover 3,270,000 square feet of surface with a monomolecular layer. Therefore, when films are specified to cover from 10,000 to 80,000 square feet of surface they must be from 40 to about 300 molecules thick. This is of an entirely different order of thickness from that claimed by these applicants.

Since the films of this invention are both hydrophobic and oleophobic, they provide effective protection to metal and other surfaces from contact with water, aqueous solutions, gases and other corrosive substances, provided the surfaces bearing these films are not subject to abrasions. Unlike surfaces coated with the usual slushing oils, the surfaces protected by these films are dry and appear to be uncoated because the films are, of course, invisible.

The oleophobic properties of these films may be used to confine lubricating oil around small bearings, such as are found in instruments by depositing such a film around the bearing. In this way a drop of oil placed on the bearing is prevented from flowing away over the surface of the instrument. The most satisfactory films for this purpose are the highly oleophobic ones, such as adsorbed from hot solutions of long chain polar compounds which are virtually insoluble in the heavier hydrocarbon oils at room temperature.

By dissolving a small amount of a soluble polar compound of the kind described in the oil, the oleophobic film is kept intact even though it becomes impaired by abrasion at various times, such as when cleaning the bearing.

Many variations will be apparent to those skilled in the art, and the invention should not be limited other than as defined by the appended claims.

The invention described herein may be manufactured and used by or for the Government of the United States of America for governmental purposes without the payment of any royalties thereon or therefor.

What is claimed is:
1. Process for protecting metal surfaces by providing on the surface a dry, invisible oleophobic and hydrophobic monomolecular film consisting of closely packed and aligned molecules of primary -n-octadecylamine, the methyl group of the primary -n-octadecylamine standing away from the surface and the amino group thereof being oriented and adsorbed to the surface, which comprises dipping the surface in clean, smooth condition into a solution consisting of primary -n-octadecylamine in a higher boiling liquid hydrocarbon which does not wet the primary -n-octadecylamine when the latter is adsorbed to the surface, allowing adsorption of the primary -n-octadecylamine from the solution to the surface to take place at a temperature below that at which the surface becomes wetted by the solution and at which an oleophobic film is formed thereon, and slowly withdrawing the surface from the solution at a rate such that the emerging surface has no drops of the solution adhering thereto.

2. A smooth metal surface having adsorbed thereto a dry, invisible, oleophobic and hydrophobic monomolecular film consisting of closely packed and aligned molecules of primary -n-octadecylamine of which the methyl group stands away from the surface and the amino group is oriented and adsorbed to the same.

References Cited in the file of this patent

UNITED STATES PATENTS

| | | |
|---|---|---|
| 2,108,641 | Blodgett | Feb. 15, 1938 |
| 2,293,580 | Walker | Aug. 18, 1942 |
| 2,333,206 | Sloan | Nov. 2, 1943 |
| 2,369,946 | Cohen | Feb. 20, 1945 |
| 2,417,028 | Wells | Mar. 4, 1947 |